H. NEWBOLD.
RIMLESS EYEGLASS MOUNT.
APPLICATION FILED JUNE 21, 1920.
1,387,898.
Patented Aug. 16, 1921.
2 SHEETS—SHEET 2.
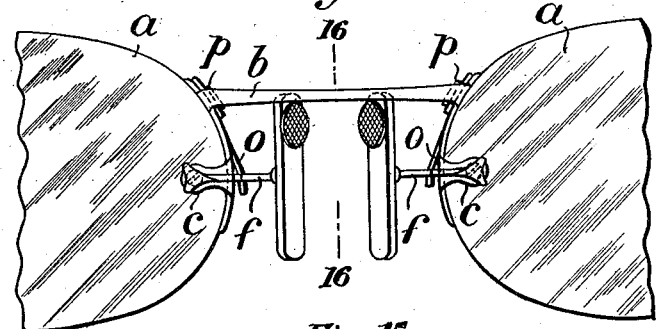
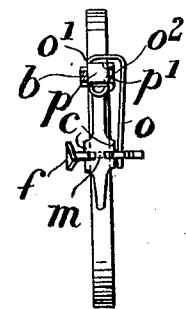
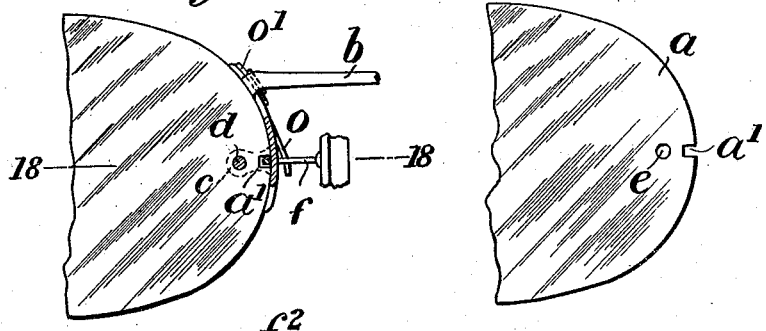
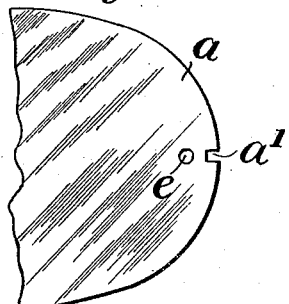
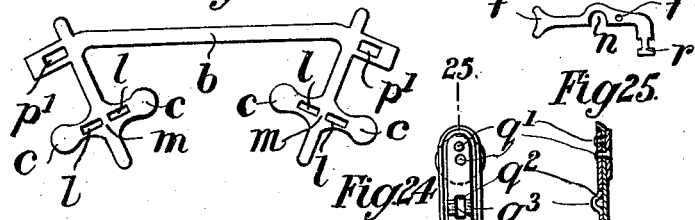
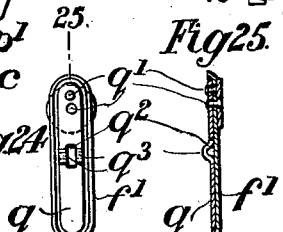
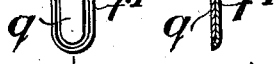
Inventor
Harry Newbold
George A. _____ Attorney.

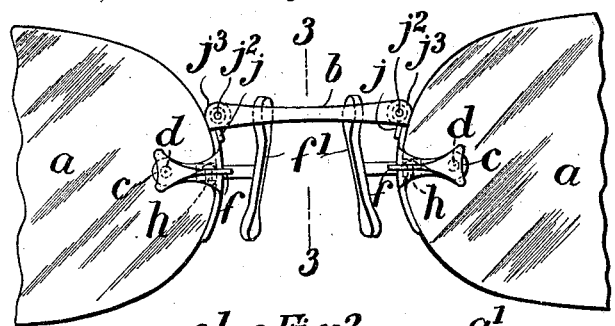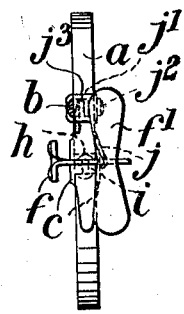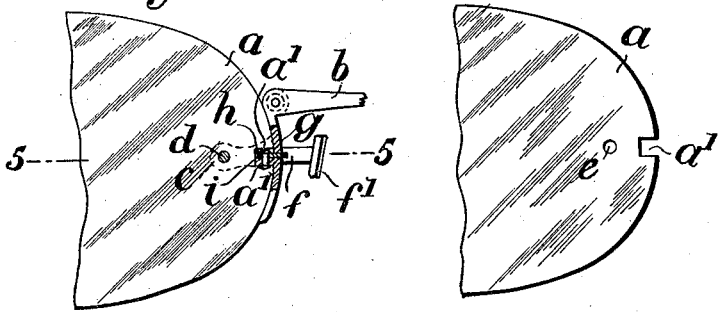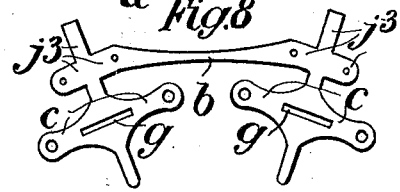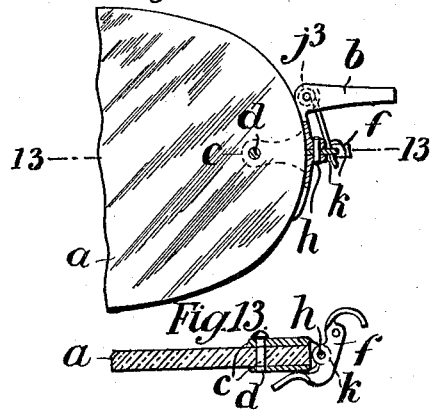

UNITED STATES PATENT OFFICE.

HARRY NEWBOLD, OF ST. ALBANS, ENGLAND.

RIMLESS-EYEGLASS MOUNT.

1,387,898.   Specification of Letters Patent.   Patented Aug. 16, 1921.

Application filed June 21, 1920. Serial No. 390,643.

*To all whom it may concern:*

Be it known that I, HARRY NEWBOLD, a subject of the King of Great Britain, residing at St. Bernards, Cumberland Road, St. Albans, Herts, England, have invented new and useful Improvements in Rimless-Eyeglass Mounts, of which the following is a specification.

This invention relates to rimless eyeglass mounts of the type commonly known as finger-piece mounts.

In finger-piece mounts the placket-arms have hitherto been pivoted upon vertical pins secured to horizontal extensions of the bridge, the ends of which extensions are soldered to the straps to which the lenses are fixed, spiral springs being provided in connection with the said placket-arms to apply the necessary pressure upon the nose of the wearer.

As will be obvious, with this construction of mount the pivot fittings for the placket-arms of finger-pieces, being placed between the bridge proper and the lens straps are fully visible, thus detracting somewhat from the appearance of the mount.

Now, the main object of my invention is to improve the appearance, and at the same time to simplify the construction, of this class of mount and to this end I pivot the placket-arms to the mount in such a manner that the pivot fittings are invisible, or practically so, when the eyeglasses are in position.

In a suitable arrangement for carrying out the invention the pivot-pins for the placket-arms are located within the space between each pair of lens-straps, the lenses being notched or recessed to receive the said pins, and the bridge being furnished with slots at those parts to receive the placket-arms. Or, the said pivot pins may be formed as a part of the bridge or may be carried by lugs formed externally on the bridge and adjacent to the straps.

In practice I prefer to stamp the bridge and straps from a single blank of metal, the said bridge and straps being then slotted horizontally as above described. Between the straps of each pair, and either above or below the slot there is secured (or formed integral with the straps) a lug having a hole to receive the pivot-pin. Any suitable type of spring may be fitted to the placket-arms or finger-pieces, such as a spring of wire one end of which engages a hole in the said arm and the other is formed with a coil or loop located in a box on the bridge in a known manner. Or the spring may comprise a length of wire the lower end of which engages a hole in the placket-arm and the upper end of which, carried in a housing at the end of the bridge proper, is bent to form a projection or nose, the said housing being furnished with a hole into which the projection or nose snaps when the upper end of the spring is pressed into position in the housing, thus allowing of the spring being fitted into position and removed with facility.

To enable the invention to be fully understood, I will describe it by reference to the accompanying drawing, in which:—

Figure 1 is a front view of a pair of eyeglasses embodying one form of the invention.

Fig. 2 is a plan thereof.

Fig. 3 is a section on the line 3—3, Fig. 1.

Fig. 4 is a sectional front view illustrating a part of a lens and a portion of the fitting.

Fig. 5 is a section on the line 5—5, Fig. 4.

Fig. 6 is a front view of a portion of the lens detached.

Fig. 7 is a view similar to Fig. 5 but with the placket-arm removed.

Fig. 8 is a view illustrating the stamping from which the mount is formed.

Fig. 9 is a similar view of the stamping from which the placket-arm is formed.

Figs. 10 and 11 are two views at right angles to one another illustrating one form of spring.

Fig. 12 is a view similar to Fig. 4 but illustrating a modified form of the fitting.

Fig. 13 is a section on the line 13—13, Fig. 12.

Fig. 14 is a view similar to Fig. 1 illustrating a further modification of the invention.

Fig. 15 is a plan view thereof.

Fig. 16 is a section on the line 16—16, Fig. 14, but with the placket omitted.

Fig. 17 is a sectional front view illustrating a portion of the lens and its fitting.

Fig. 18 is a section on the line 18—18, Fig. 17.

Fig. 19 is a view of a portion of the lens used in this modification.

Fig. 20 is a view similar to Fig. 18 but with the placket-arm removed.

Fig. 21 is a view of the stamping from which the fitting is formed.

Fig. 22 is a similar view of the stamping from which the placket-arm is produced.

Fig. 23 is a view of another form of spring.

Fig. 24 is a rear view of the placket, and

Fig. 25 is a section on the line 25—25, Fig. 24.

Referring first to the construction illustrated in Figs. 1 to 11, $a$ indicates the lenses and $b$ the bridge of the mount, $c$ indicating the lens-straps which are integral with the bridge $b$ and between each pair of which lens-straps the lens is secured in the known manner by a pin, screw or rivet $d$ passing through holes in the straps and a hole $e$ in the lens. $f$ indicates the placket-arm and $f^1$ the placket which may be of any suitable known form. The placket-arm is passed through the slot $g$ provided in the bridge between the lens-straps $c$ and is pivoted by the pins $h$ to the internal lug $i$ provided on the said bridge. The lens $a$ is recessed as indicated at $a^1$ to receive the said pivot.

As will be seen from an inspection of the drawing the pivot fitting is entirely invisible from the front, and the mount as a whole has a neat appearance.

The plackets are urged toward one another by means of springs which may be in any convenient form. In modification now being described, the form of spring shown separately in Figs. 10 and 11 is made use of and comprises a length of wire $j$, one end of which engages in a hole $f^2$ in the placket-arm and the other end of which is furnished with a coil $j^1$ which engages around a pin $j^2$ located in a box or housing $j^3$ at the end of the bridge $b$.

As above mentioned, I prefer to form the bridge $b$ together with the lens-straps $c$ in one piece from a blank, and the stamping is shown in Fig. 8. Similarly, the placket-arm, $f$ is likewise preferably produced from a single blank, the stamping being illustrated in Fig. 9.

In Figs. 12 and 13 there is shown a construction of mount which is very similar to that above described and shown in Figs. 1 to 11, the difference residing in the fact that the placket-arm pivot pin, instead of being located between the two lens-straps $c$, is carried by lugs $k$ on the bridge between the lens straps $c$ externally of the said bridge. The pivot is thus slightly visible, but in practice, this is only so to a slight extent, the said pivot being, to all intents and purposes, invisible.

Figs. 14 to 25 show a further modification, in which the pivot for the placket-arm is formed integral with the bridge between the lens straps $c$. For this purpose, the said bridge is furnished, adjacent to the said straps, that is to say, at the root of the latter, with slots $l$ leaving a solid portion or pivot $m$ between the said slots and centrally of the lens. The placket-arm $f$ is made with a semi-circular or approximately semicircular notch or recess $n$ which bears against the inner face of the bar or pivot $m$ when the said placket-arm is passed through the slot $l$, as clearly indicated in Fig. 18. In this case, also, the mount is formed from a single stamping, shown in Fig. 21, and the placket arm from a stamping, which is illustrated in Fig. 22. The placket-arm spring in the construction here illustrated, is of a different form from that above described, and is shown separately in Fig. 23. It comprises a length of wire $o$, the lower end of which is designed to engage with the hole $f^2$ in the placket-arm $f$ and the upper end of which is bent to form a loop $o^1$ with a projection $o^2$ on the inner end of the said loop. This looped portion is designed to be located in the housing $p$ in the bridge $b$, the said housing being furnished with a hole $p^1$, see Figs. 15, 16, and 21, into which the projection or nose $o^2$ on the spring loop snaps, when the said loop is pressed into position in the housing. The spring can thus be fitted into position and removed with facility.

In this modification of the invention, I have illustrated a novel form of placket and a novel method of attachment of the said placket to the placket-arm $f$. The placket $f^1$ has fitted to its rear face a spring plate $q$ which is secured to the said placket at one end, as shown at $q^1$. Midway of its length the said spring plate is furnished with a longitudinal slot $q^2$ flanked on each side by a transverse corrugation $q^3$. The extremity of the placket-arm $f$ to which the placket is to be attached is made of the T-form indicated at $r$, the cross piece or head of the said T being designed to be passed through the slot $q^2$ and then turned at right angles so as pivotally to engage in the transverse corrugations $q^3$. By this construction the placket can be easily fitted in place and detached when required for any purpose.

Claims:

1. A rimless eyeglass mount of the kind herein referred to, comprising lens straps and placket arms, a bridge furnished with a pair of slots at the root of said lens straps leaving a bar between the slots which serves as a pivot for the placket arms, and a lens provided with a peripheral notch to receive said pivot and placket arms.

2. In a rimless eyeglass mount of the kind herein referred to, comprising a placket arm, a bridge provided with a housing at one end, a placket arm spring comprising a length of wire, the lower end of which engages a hole in the placket arm and the upper end of which, carried in said housing at the end of the bridge proper, is bent to form a projection or nose, the said housing being furnished with a hole into which the projection or nose snaps when the said upper end of the spring is pressed into position in the housing.

3. A rimless eyeglass mount of the kind herein referred to, comprising lens straps and placket arms, a bridge furnished with a pair of slots at the root of said lens straps, leaving a bar between the slots which serves as a pivot for the placket arms, said placket arms passing through said slots, and a lens provided with a peripheral notch to receive said pivot and placket arms.

HARRY NEWBOLD.